US008939257B2

(12) United States Patent
Nakamura et al.

(10) Patent No.: US 8,939,257 B2
(45) Date of Patent: Jan. 27, 2015

(54) POWER TRAIN MECHANISM INCLUDING A SURROUNDING MEMBER (75) Inventors: Kazuaki Nakamura, Toyota (JP); Kazuyuki Watanabe, Anjou (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1665 days.

(21) Appl. No.: 11/548,455

(22) Filed: Oct. 11, 2006

(65) Prior Publication Data
US 2007/0137920 A1 Jun. 21, 2007

(30) Foreign Application Priority Data
Oct. 20, 2005 (JP) .................. 2005-306075

(51) Int. Cl.
 F16H 57/04 (2010.01)
 F16D 25/12 (2006.01)
(52) U.S. Cl.
 CPC .......... F16D 25/123 (2013.01); F16H 57/0421 (2013.01); F16H 57/043 (2013.01)
 USPC ........................................ 184/6.12; 192/3.28
(58) Field of Classification Search
 USPC ........................................................ 184/6.12
 See application file for complete search history.

(56) References Cited

U.S. PATENT DOCUMENTS

| 3,126,079 | A | | 3/1964 | Howard |
| 5,101,953 | A | * | 4/1992 | Payvar ................. 192/107 R |
| 5,404,964 | A | * | 4/1995 | Zinsmeyer et al. ......... 184/6.12 |
| 5,689,993 | A | * | 11/1997 | Matsumoto ................... 73/162 |
| 6,334,422 | B1 | * | 1/2002 | Sumi et al. .............. 123/196 R |
| 6,467,578 | B1 | * | 10/2002 | Winfree ....................... 184/6.12 |
| 6,494,303 | B1 | | 12/2002 | Reik et al. |
| 2004/0242358 | A1 | | 12/2004 | Tanikawa |
| 2005/0107202 | A1 | | 5/2005 | Min |
| 2006/0123944 | A1 | | 6/2006 | Suzuki et al. |

FOREIGN PATENT DOCUMENTS

| DE | 43 21 655 A1 | | 1/1995 |
| DE | 199 16 377 A1 | | 10/1999 |
| EP | 0 560 203 A1 | | 9/1993 |
| EP | 1 229 270 A2 | | 8/2002 |
| FR | 2 298 744 | | 8/1976 |
| GB | 2 092 710 A | | 8/1982 |
| GB | 2092710 A | * | 8/1982 ............... F16D 3/12 |
| JP | 62-17428 | | 1/1987 |

(Continued)

Primary Examiner — Robert A Siconolfi
Assistant Examiner — James Hsiao
(74) Attorney, Agent, or Firm — Oblon, Spivak, McClelland, Maier & Neustadt, L.L.P.

(57) ABSTRACT

The invention provides a power train mechanism capable of decreasing a rotational resistance. The power train mechanism includes: a clutch drum; a forced feed oil passage and a central oil passage for supplying oil to the clutch drum; an oil reservoir provided below the clutch drum; an outer circumferential surface surrounding member for surrounding an outer circumferential surface of the clutch drum, while facing the outer circumferential surface with a clearance therebetween to such a degree as to avoid contact with the outer circumferential surface during rotation of the outer circumferential surface of the clutch drum; and a trans-axle rear cover provided continuously to the outer circumferential surface surrounding member, for surrounding axial one end surface of the clutch drum, in which a side of the outer circumferential surface surrounding member axially opposite to the trans-axle rear cover is an open end.

10 Claims, 10 Drawing Sheets (56) References Cited

FOREIGN PATENT DOCUMENTS

| | | |
|---|---|---|
| JP | 3-69847 | 3/1991 |
| JP | 6-288466 | 10/1994 |
| JP | 10-274256 | 10/1998 |
| JP | 2001-221326 | 8/2001 |
| JP | 2003-287056 | 10/2003 |
| JP | 2004-278667 | 10/2004 |
| JP | 2006-162039 | 6/2006 |
| RU | 2246059 C2 | 2/2005 |
| WO | WO 99/09304 | 2/1999 |
| WO | WO99/09304 * | 2/1999 ............ F01M 11/06 |

* cited by examiner

TO LEFT DRIVE SHAFT

TO RIGHT DRIVE SHAFT

← BLOW-BY GAS
⇐ FRESH AIR

POWER TRAIN MECHANISM INCLUDING A SURROUNDING MEMBER

This nonprovisional application is based on Japanese Patent Application No. 2005-306075 filed with the Japan Patent Office on Oct. 20, 2005, the entire contents of which are hereby incorporated by reference.

BACKGROUND OF THE INVENTION

1. Field of the Invention

This invention relates to a power train mechanism, and more specifically to a power train mechanism mounted on a vehicle.

2. Description of the Background Art

A conventional power train mechanism is disclosed, for example, in Japanese Patent Laying-Open Nos. 2004-278667 and 2001-221326.

SUMMARY OF THE INVENTION

Japanese Patent Laying-Open No. 2004-278667 discloses a gear train structure of a planetary gear type automatic transmission. Japanese Patent Laying-Open No. 2001-221326 discloses a technique in which a member for storing oil between a gear and the member is formed along a shape of the outer diameter of the gear to reduce an amount of agitated oil.

In the techniques described above, there is a problem that, when a member constituting the power train mechanism is rotated, a large resistance is generated by the rotation, thereby generating energy loss.

This invention has been conceived to solve the above problem. It is an object of this invention to provide a power train mechanism capable of smooth rotation.

The power train mechanism according to one aspect of this invention includes: at least one rotating member; oil supply passages for supplying oil to the rotating member; an oil reservoir provided below the rotating member; an outer circumferential surface surrounding member for surrounding an outer circumferential surface of the rotating member, while facing the outer circumferential surface with a clearance therebetween to such a degree as to avoid contact with the outer circumferential surface during rotation of the outer circumferential surface of the rotating member; and an end surface surrounding member provided continuously to the outer circumferential surface surrounding member, for surrounding axial one end surface of the rotating member, in which a side of the outer circumferential surface surrounding member axially opposite to the end surface surrounding member is an open end.

In the power train mechanism thus configured, the outer circumferential surface surrounding member surrounds the outer circumferential surface, while facing the outer circumferential surface with a clearance therebetween to such a degree as to avoid contact with the outer circumferential surface during rotation of the outer circumferential surface of the rotating member, and the end surface surrounding member provided continuously to the outer circumferential surface surrounding member surrounds axial one end surface of the rotating member, thereby discharging, from the open end, air around the rotating member covered with the both surrounding members by the rotation of the rotating member, and lowering air pressure around the rotating member to decrease an air resistance. In addition, since the side of the outer circumferential surface surrounding member axially opposite to the end surface surrounding member is the open end, oil such as lubricating oil supplied to the rotating member is prevented from being stored in the surrounding members even if the oil is drained from the rotating member. Further, even in a case where, with increase in an oil temperature, a surface of oil stored in the oil reservoir rises to such a position at which the rotating member is soaked, an amount of the oil causing a rotating resistance of the rotating member is limited within a range surrounded by the surrounding members, thereby reducing the rotating resistance by the oil.

Preferably, oil drain holes are formed at a predetermined position in an axial direction of the outer circumferential surface of the rotating member, and an axial length of the outer circumferential surface surrounding member is set so as not to cover the oil drain holes in the axial direction. In this case, since the axial length of the outer circumferential surface surrounding member is set so as not to cover the oil drain holes in the axial direction, the outer circumferential surface surrounding member does not become an obstacle for oil drain, thereby securing oil drain performance.

Preferably, a plurality of grooves or ribs inclining with respect to a rotation direction of the rotating member from a side of the end surface surrounding member to the open end is provided on an inner circumferential surface of the outer circumferential surface surrounding member. In this case, air or oil is easily drained from the open end along the grooves or ribs by the rotation of the rotating member.

A power train mechanism according to another aspect of this invention includes: a rotating member formed with teeth on an outer circumferential surface, in which the teeth are lubricated with oil; an outer circumferential surface surrounding member for surrounding an outer circumferential surface of the rotating member, while facing the outer circumferential surface with a clearance therebetween to such a degree as to avoid contact with the outer circumferential surface during rotation of the outer circumferential surface of the rotating member; and an end surface surrounding member provided continuously to the outer circumferential surface surrounding member, for surrounding axial one end surface of the rotating member. A side of the outer circumferential surface surrounding member axially opposite to the end surface surrounding member is an open end.

In the power train mechanism thus configured, since air around the rotating member covered with the outer circumferential surface surrounding member and the end surface surrounding member is drained from the open end by the rotation of the rotating member, air pressure around the rotating member is lowered to decrease an air resistance. In addition, since the outer circumferential surface surrounding member is disposed with a clearance therebetween to such a degree as to avoid contact with the outer circumferential surface of the rotating member having the teeth lubricated with oil, even if the oil lubricating the teeth spatters outward by a centrifugal force, the spattered oil is collected by the outer circumferential surface surrounding member, thereby allowing lubrication of the teeth again. As a result, it is possible to achieve smooth lubrication of teeth.

A power train mechanism according to further another aspect of this invention includes: a rotating member constituting a fluid drive device; an outer circumferential surface surrounding member provided in operating fluid of the fluid drive device, for surrounding an outer circumferential surface of the rotating member, while facing the outer circumferential surface with a clearance therebetween to such a degree as to avoid contact with the outer circumferential surface during rotation of the outer circumferential surface of the rotating member; and an end surface surrounding member provided continuously to the outer circumferential surface surrounding member, for surrounding axial one end surface of the rotating member. A side of the outer circumferential surface surrounding member axially opposite to the end surface surrounding member is an open end.

In the power train mechanism thus configured, air pressure around the rotating member covered with the outer circumferential surface surrounding member and the end surface surrounding member is lowered, thereby decreasing a fluid resistance.

Preferably, the power train mechanism further includes a lock-up clutch. The outer circumferential surface surrounding member extends from the end surface surrounding member to the open end so as to close toward the lock-up clutch.

In the power train mechanism thus configured, since operating fluid drained from the open end flows toward the lock-up clutch, it is possible to cool the lock-up clutch.

A power train mechanism according to further another aspect of this invention includes: a rotating member for converting reciprocating movement of a piston into rotational movement and being lubricated with oil; an outer circumferential surface surrounding member for surrounding an outer circumferential surface of the rotating member soaked in the oil, while facing the outer circumferential surface with a clearance therebetween to such a degree as to avoid contact with the outer circumferential surface during rotation of the outer circumferential surface of the rotating member; and an end surface surrounding member provided continuously to the outer circumferential surface surrounding member, for surrounding axial one end surface of the rotating member. A side of the outer circumferential surface surrounding member axially opposite to the end surface surrounding member is an open end.

In the power train mechanism thus configured, since fluid around the rotating member covered with the outer circumferential surface surrounding member and the end surface surrounding member is drained from the open end by the rotation of the rotating member, air pressure around the rotating member is lowered to decrease a fluid resistance. In addition, since the outer circumferential surface surrounding member surrounds the outer circumferential surface that is soaked in oil, it is possible to control a flow of the oil around the outer circumferential surface lubricated by the oil and to prevent an occurrence of air bubbles in the oil. Whereby, smooth operation can be conducted.

According to this invention, it is possible to provide a power train mechanism including a rotating member enabling smooth operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A description will be hereinafter given of embodiments of this invention with reference to the drawings. It is to be noted that, in the following embodiments, identical or corresponding parts are given the same reference characters, and a description thereof will not be repeated.

First Embodiments

Figure 1:
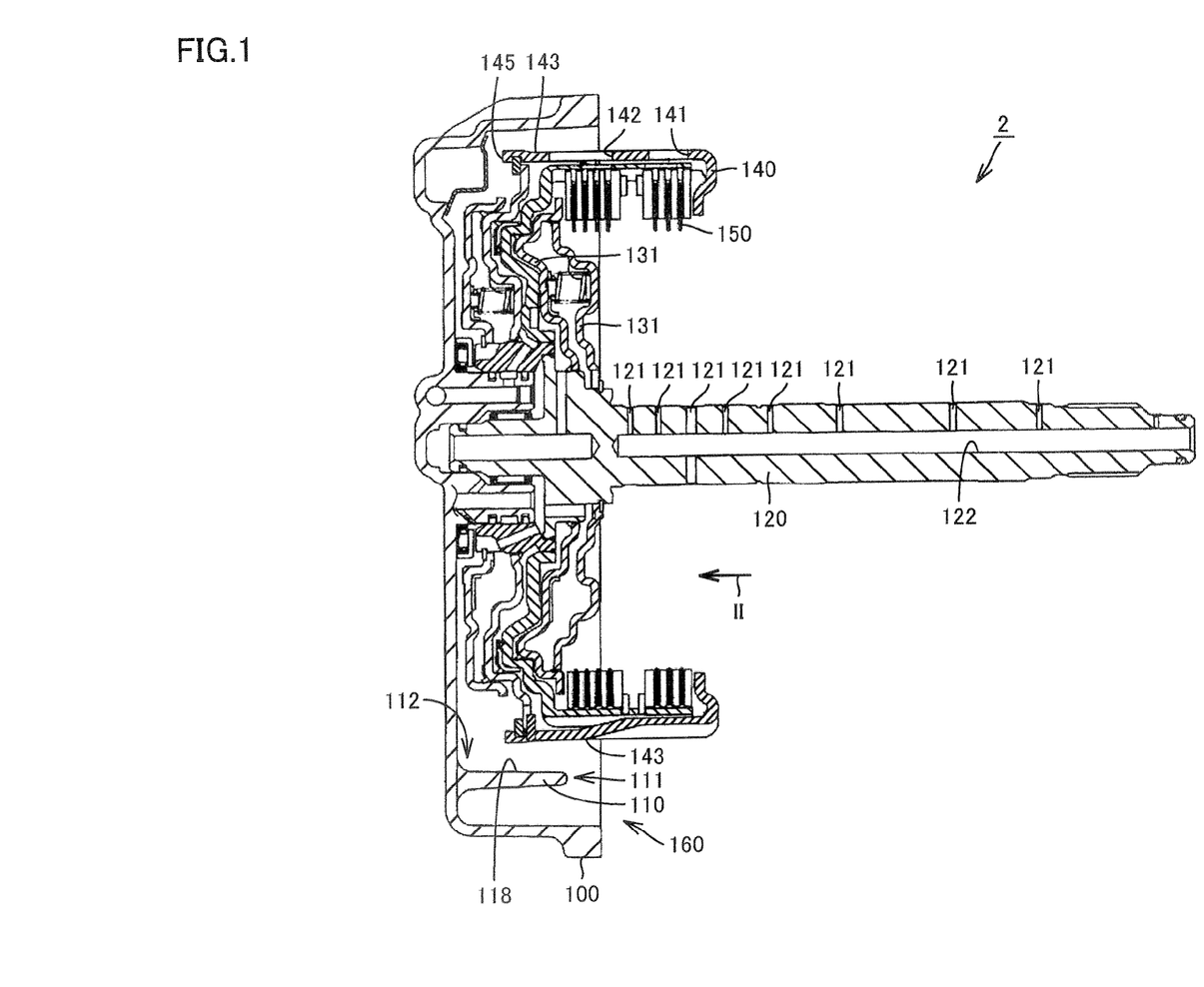
FIG. 1 is a cross sectional view of a power train mechanism according to a first embodiment of this invention.

FIG. 1 is a cross sectional view of a power train mechanism according to a first embodiment of this invention. With reference to FIG. 1, the power train mechanism according to the first embodiment of this invention constitutes an automatic transmission, in which a power train part 131 is mounted to an outer circumference of a shaft 120. Each power train part 131 has a circular disk shape and a clutch drum 140 is fixed to an outer circumference of the power train part 131. A frictional engagement element 150 is fixed on an inner circumferential side of clutch drum 140, and transmits a power to a mating member by direct contact.

Clutch drum 140 has a cylindrical shape, and oil drain holes 141, 142 are provided so as to pass through clutch drum 140 in its thickness direction. A plurality of oil drain holes 141, 142 are provided along a circumferential direction of clutch drum 140. A part of clutch drum 140 and shaft 120 are covered with a trans-axle rear cover 100. Trans-axle rear cover 100 holds and covers an end of shaft 120.

An oil reservoir 160 constituted by an oil pan is provided below clutch drum 140, and stores oil.

An outer circumferential surface surrounding member 110 is provided so as to face an outer circumferential surface 143 of clutch drum 140. Outer circumferential surface surrounding member 110 has a circular arc shape, and extends in a direction in which shaft 120 extends. A trans-axle rear cover 100 side of outer circumferential surface surrounding member 110 is a closed end 112, while an opposite side thereof is an open end 111.

Shaft 120 has a central oil passage 122 extending in an axial direction and a forced feed oil passage 121 radially extending from central oil passage 122. Oil from an oil pump is supplied to central oil passage 122. The oil is constituted by automatic transmission fluid (ATF) as operating fluid or working fluid. The oil is fed from forced feed oil passage 121 toward an outer circumference. The oil that has been fed lubricates and cools frictional engagement element 150, and is drained from oil drain holes 141, 142 toward outside.

The power train mechanism includes: at least one clutch drum 140 as a rotating member; forced feed oil passage 121, central oil passage 122 as an oil supply passage for supplying oil to clutch drum 140; oil reservoir 160 provided below clutch drum 140; outer circumferential surface surrounding member 110 for surrounding outer circumferential surface 143 of clutch drum 140, while facing outer circumferential surface 143 with a clearance therebetween to such a degree as to avoid contact with outer circumferential surface 143 during rotation of outer circumferential surface 143 of clutch drum 140; and trans-axle rear cover 100 as an end surface surrounding member provided continuous to outer circumferential surface surrounding member 110, for surrounding axial one end surface 145 of clutch drum 140, in which a side of the outer circumferential surface surrounding member axially opposite to trans-axle rear cover 100 is open end 111.

Outer circumferential surface surrounding member 110 as a cover is provided to outer circumferential surface 143 of clutch drum 140 that rotates at a high speed, so as to form a clearance. One side of outer circumferential surface surrounding member 110 is open end 111, while the other is closed end 112.

Figure 2:
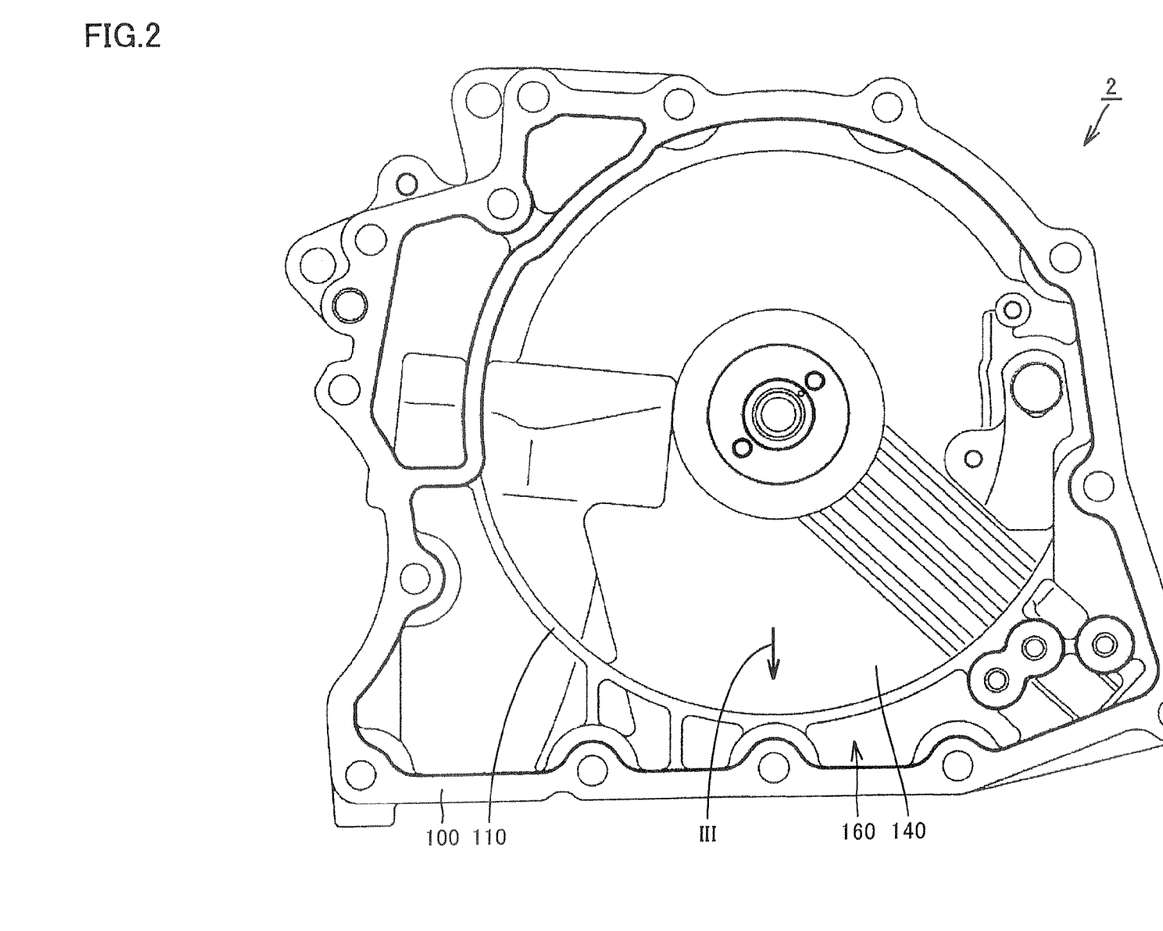
FIG. 2 is a side view of an automatic transmission as viewed from a direction shown by arrow II in FIG. 1.

FIG. 2 is a side view of the automatic transmission as viewed from a direction shown by arrow II in FIG. 1. With reference to FIG. 2, in trans-axle rear cover 100, outer circumferential surface surrounding member 110 having a circular arc shape is provided. Clutch drum 140 is disposed with a clearance between clutch drum 140 and outer circumferential surface surrounding member 110. Clutch drum 140 rotates with respect to outer circumferential surface surrounding member 110. The clearance between clutch drum 140 and outer circumferential surface surrounding member 110 is substantially constant. Oil reservoir 160 is provided below clutch drum 140.

Figure 3:
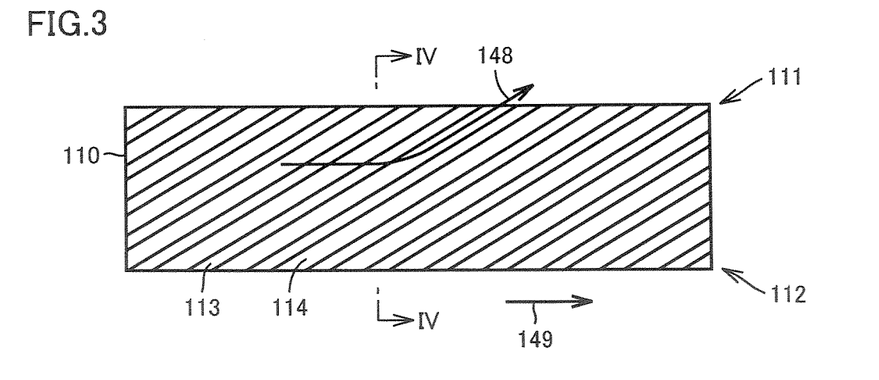
FIG. 3 is a plan view of an outer circumferential surface surrounding member as viewed from a direction shown by arrow III in FIG. 2.
Figure 4:
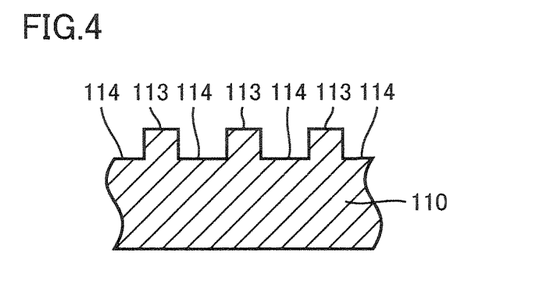
FIG. 4 is a cross sectional view taken along line IV-IV in FIG. 3.

FIG. 3 is a plan view of the outer circumferential surface surrounding member as viewed from a direction shown by arrow III in FIG. 2. FIG. 4 is a cross sectional view taken along line IV-IV in FIG. 3. With reference to FIG. 3 and FIG. 4, outer circumferential surface surrounding member 110 is a cylindrical cover, and air and oil moving along with the rotating body are drained to an open end 111 side along ribs 113 and grooves 114 that are provided in the cover and extend in an oblique direction. With rotation of the clutch drum in a direction shown by arrow 149, the air and the oil flow in a direction shown by arrow 148.

In FIG. 3, ribs 113 and grooves 114 extend linearly, however this invention is not limited to these. Ribs 113 and grooves 114 may extend with curvature. Inclination of ribs 113 and grooves 114 with respect to the direction shown by arrow 149 may be changed. That is to say, the inclination of ribs 113 and grooves 114 may become large or may become small, as approaching from closed end 112 to open end 111.

Figure 5:
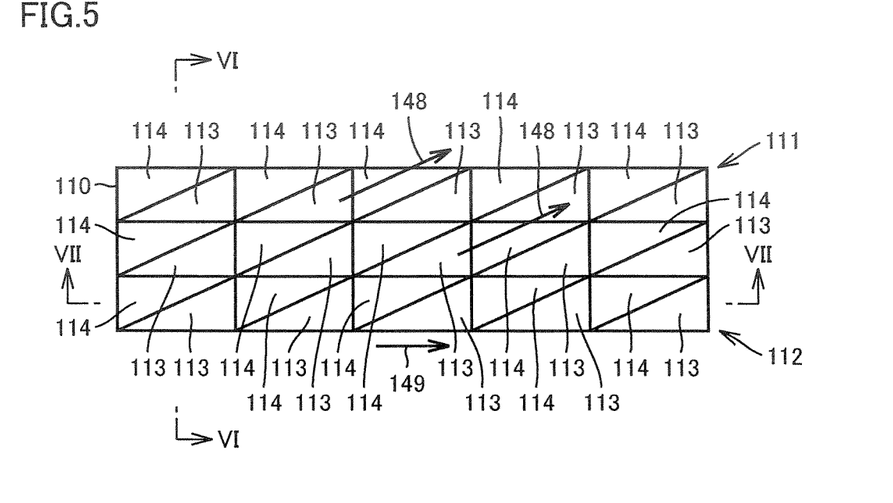
FIG. 5 is a plan view of the outer circumferential surface surrounding member according to another aspect.
Figure 6:
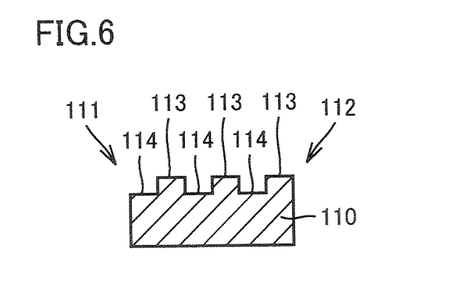
FIG. 6 is a cross sectional view taken along line VI-VI in FIG. 5.
Figure 7:
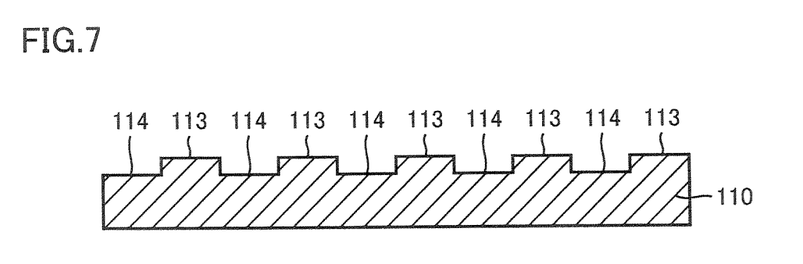
FIG. 7 is a cross sectional view taken along line VII-VII in FIG. 5.

FIG. 5 is a plan view of the outer circumferential surface surrounding member according to another aspect. FIG. 6 is a cross sectional view taken along line VI-VI in FIG. 5. FIG. 7 is a cross sectional view taken along line VII-VII in FIG. 5. With reference to FIG. 5 to FIG. 7, ribs 113 and grooves 114 having a triangular prism shape may be provided. That is to say, outer circumferential surface surrounding member 110 shown in FIG. 5 to FIG. 7 is provided with triangular prisms covered thereover and the triangular prisms constitute ribs 113. The longest side of each rib 113 inclines with respect to a rotation direction showed by arrow 149. The air and the oil flow in a direction shown by allow 148 along inclined surfaces of the triangular prisms.

Figure 8:
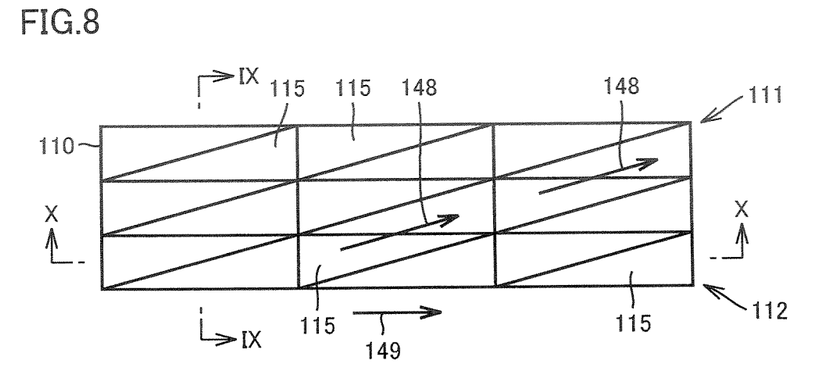
FIG. 8 is a plan view of the outer circumferential surface surrounding member according to further another aspect.
Figure 9:
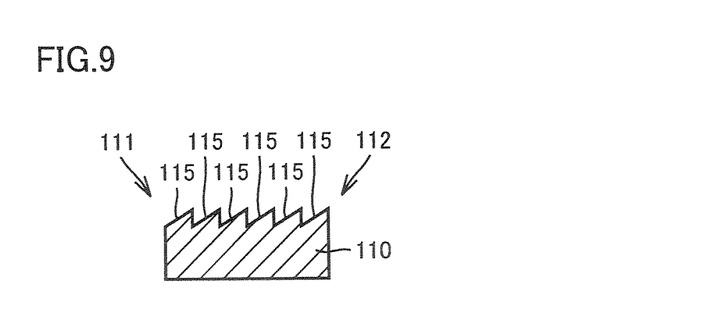
FIG. 9 is a cross sectional view taken along line IX-IX in FIG. 8.
Figure 10:
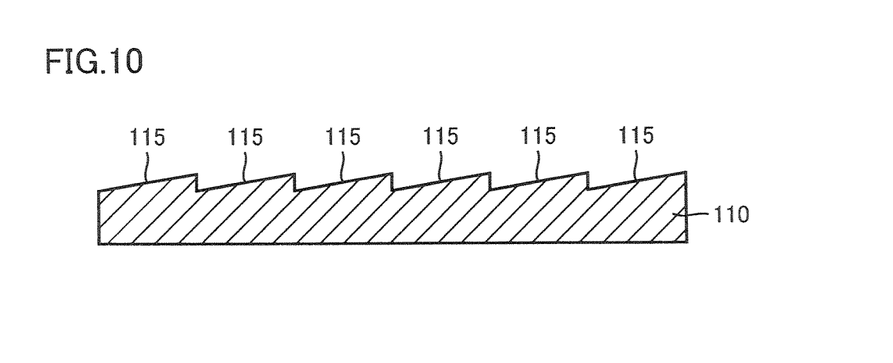
FIG. 10 is a cross sectional view taken along line X-X in FIG. 8.

FIG. 8 is a plan view of the outer circumferential surface surrounding member according to further another aspect. FIG. 9 is a cross sectional view taken along line IX-IX in FIG. 8. FIG. 10 is a cross sectional view taken along line X-X in FIG. 8. With reference to FIG. 8 to FIG. 10, triangular pyramid shapes are formed on a surface of outer circumferential surface surrounding member 110, outer circumferential surface surrounding member may be configured such that the air and the oil flow in a direction shown by arrow 148 by inclined surfaces of the triangular pyramids. In a case where concavities and convexities are constituted by these triangular prisms or triangular pyramids, and outer circumferential surface surrounding member 110 is made by die-cast, outer circumferential surface surrounding member 110 is easily removed from a die.

In the power train mechanism according to the first embodiment of this invention, thus configured, oblique directional grooves 114 and ribs 113 (convex parts) for discharging the oil and the air to the open end 111 side is provided on an inner circumference of outer circumferential surface surrounding member 110 as the cylindrical cover. Outer circumference of clutch drum 140 is covered with a narrow clearance. This achieves reduction in loss of an inside of the transmission, thereby enabling improvement in fuel consumption and power performance. Further, reduction in heating value can keep a low temperature of the oil, thereby achieving longer operation life of the oil and the transmission.

In addition, return limit of a breather is made improved by suppressing agitation, whereby it is possible to improve in facilitation of control for an oil amount and safety of a vehicle.

Second Embodiment

Figure 11:
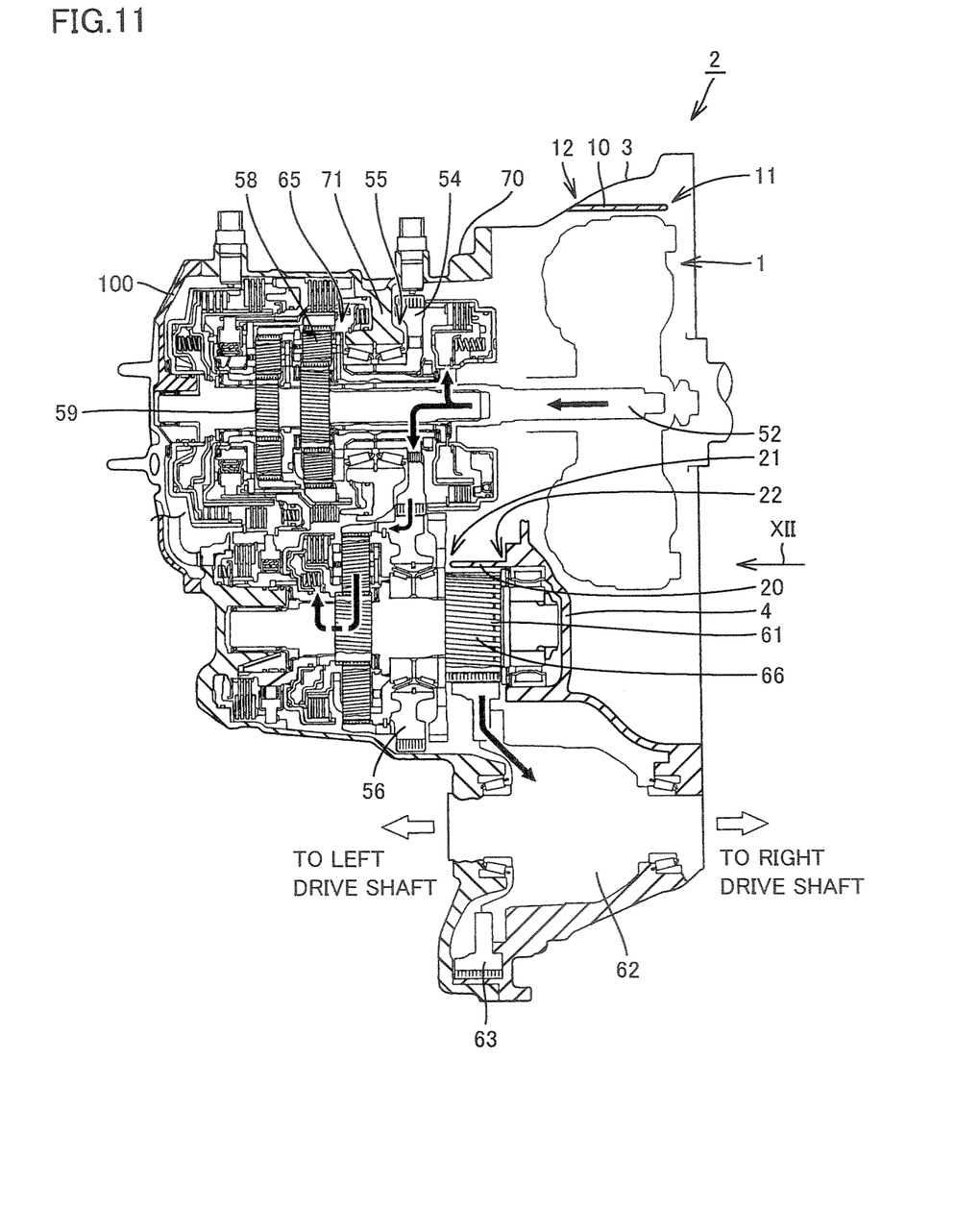
FIG. 11 is a side view including a partial cross section of a power train mechanism according to a second embodiment of this invention.

FIG. 11 is a side view including a partial cross section of a power train mechanism according to a second embodiment of this invention. With reference to FIG. 11, a trans-axle 2 as the power train mechanism according to the second embodiment of this invention includes an input shaft 52 receiving input of a torque; a rear planetary gear 59 disposed on an axis of input shaft 52; a front planetary gear 58 and a counter drive gear 54; and a counter driven gear 56 meshing with counter drive gear 54. A differential drive pinion 61 is provided next to counter driven gear 56 on an axis where counter driven gear 56 is disposed. Trans-axle 2 constituting the automatic transmission further includes a differential 62 having a ring gear 63 meshing with differential drive pinion 61.

These gears provided in trans-axle 2 are accommodated in a trans-axle case 70. An oil pan (not shown) is mounted on a bottom surface side of trans-axle case 70, and stores oil. A partition wall 71 is formed in trans-axle case 70. A main variable-speed gear chamber 65 in which rear planetary gear 59, front planetary gear 58 and the like are disposed and a counter gear chamber 55 in which counter driven gear is disposed are formed so as to be defined by partition wall 71.

Trans-axle rear cover 100 and a trans-axle housing 3 are disposed so as to come into contact with trans-axle case 70. Trans-axle housing 3 accommodates a torque converter 1. On an inner surface of trans-axle housing 3, an outer circumferential surface surrounding member 10 disposed apart from torque converter 1 is disposed. Outer circumferential surface surrounding member 10 extends from closed end 12 to open end 11 and is disposed with a predetermined clearance between a rotating element constituting torque converter 1 and outer circumferential surface surrounding member 10. Air fills around torque converter 1 and is interposed between outer circumferential surface surrounding member 10 and torque converter 1.

An outer circumferential surface surrounding member 20 covering differential drive pinion 61 is disposed in an inner wall 4 of trans-axle housing 3. Outer circumferential surface surrounding member 20 extends from closed end 22 to open end 21, and formed along differential drive pinion 61. Teeth 66 are formed on an outer circumferential surface of differential drive pinion 61, and inclines with respect to an axial direction. Teeth 66 are not limited to this structure, and may extend in the axial direction and a parallel direction.

Differential drive pinion 61 covered with outer circumferential surface surrounding member 20 is lubricated with oil. The oil is stored in the oil pan, ring gear 63 shovels the oil in the oil pan to feed the oil to differential drive pinion 61 meshing with ring gear 63, and whereby lubricating teeth 66 of differential drive pinion 61 is lubricated with the oil.

When differential drive pinion 61 is rotated, the oil collected in teeth 66 is liable to spatter to an outer circumferential part. However, since the outer circumferential surface of differential drive pinion 61 is covered with outer circumferential surface surrounding member 20, it is possible to prevent the oil from spattering and to always lubricate differential drive pinion 61 with the oil.

Figure 12:
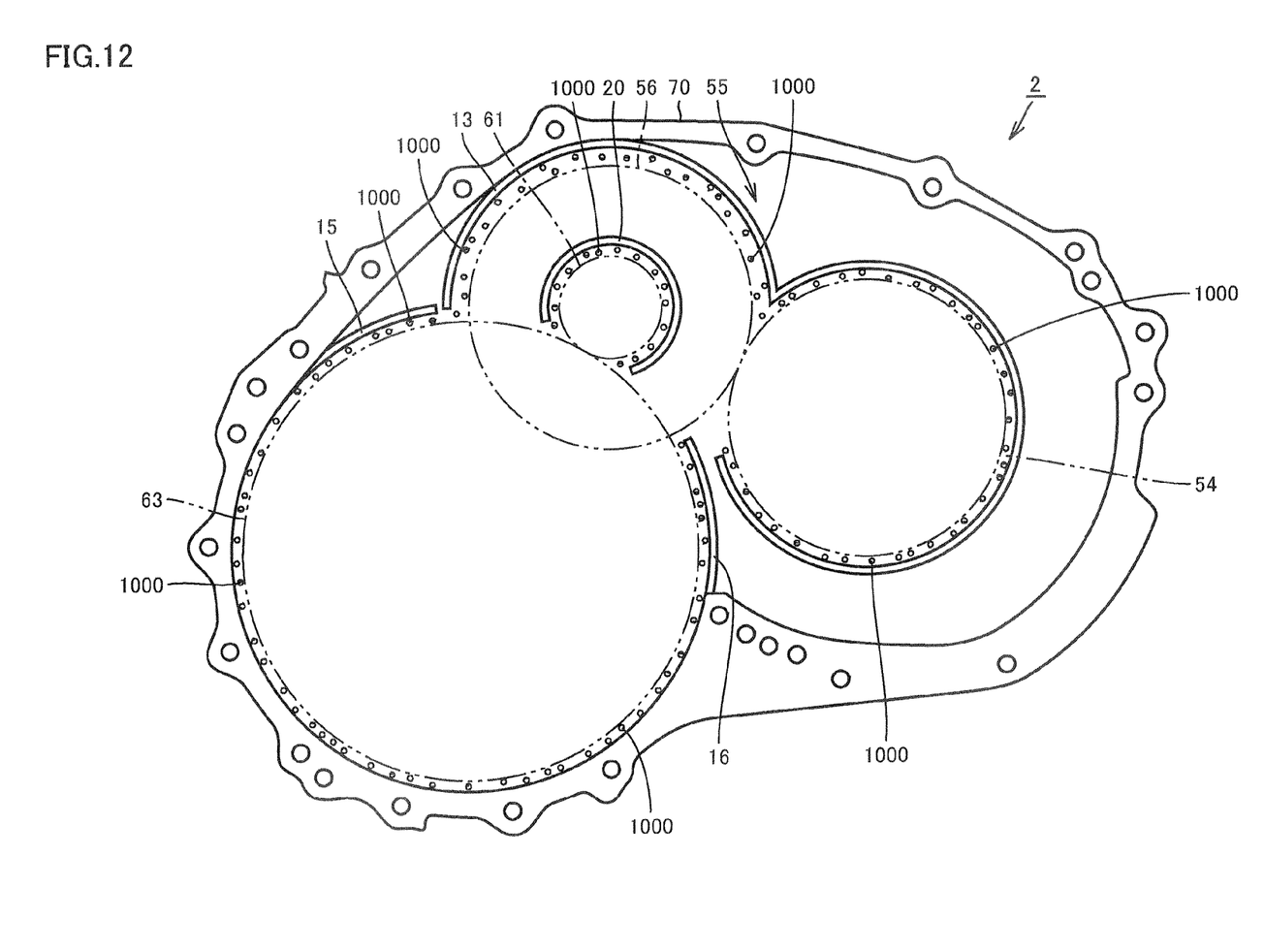
FIG. 12 is a side view of a trans-axle as viewed from a direction shown by arrow XII in FIG. 11.

FIG. 12 is a side view of the trans-axle as viewed from a direction shown by arrow XII in FIG. 11, With reference to FIG. 12, trans-axle 2 has trans-axle case 70. In trans-axle case 70, ring gear 63, differential drive pinion 61 meshing with ring gear 63, counter driven gear 56 disposed coaxially with differential drive pinion 61, and counter drive gear 54 meshing with counter driven gear 56.

Ring gear 63 draw a circular arc along trans-axle case 70, and a portion deviating from trans-axle case 70 is covered with outer circumferential surface surrounding members 15, 16. Outer circumferential surface surrounding members 15, 16 have such a length as to avoid contact with other gear, and have a circular shape along an outer circumferential surface of ring gear 63.

Differential drive pinion 61 meshes with ring gear 63, and is covered with outer circumferential surface surrounding member 20 except a part meshing with ring gear 63. Outer circumferential surface surrounding member 20 has a predetermined clearance between differential drive pinion 61 and outer circumferential surface surrounding member 20. Outer circumferential surface surrounding member 20 is disposed so as to open with respect to the part in which differential drive pinion 61 and ring gear 63 meshes with each other.

Trans-axle 2 as the power train mechanism according to the second embodiment 2 includes differential drive pinion 61 as a rotating member formed with teeth 66 on the outer circumferential surface, in which teeth 66 is lubricated with oil 1000; outer circumferential surface surrounding member 20 for surrounding an outer circumferential surface of differential drive pinion 61, while facing the outer circumferential surface with a clearance therebetween to such a degree as to avoid contact with the outer circumferential surface during rotation of the outer circumferential surface of differential drive pinion 61; and inner wall 4 as an end surface surrounding member provided continuous to outer circumferential surface surrounding member 20, for surrounding axial one end surface of differential drive pinion 61. A side of the outer circumferential surface surrounding member 20 axially opposite to the inner wall 4 is an open end 21.

Outer circumferential surface surrounding member 13 is disposed so as to cover counter driven gear 56 and counter drive gear 54. Ring gear 63, differential drive pinion 61, counter driven gear 56, and counter drive gear 54 are respectively lubricated by oil 1000. When the ring gear, differential drive pinion 61, counter driven gear 56, and counter drive gear 54 rotate, oil 1000 is drained outward. However, drained oil 1000 is returned again by holding outer circumferential surface surrounding members 15, 13, 16, 20. Accordingly, this enables reliable lubrication.

In addition, existence of the outer circumferential surface surrounding members achieves low pressure, allowing decrease in a rotational resistance.

Third Embodiment

Figure 13:
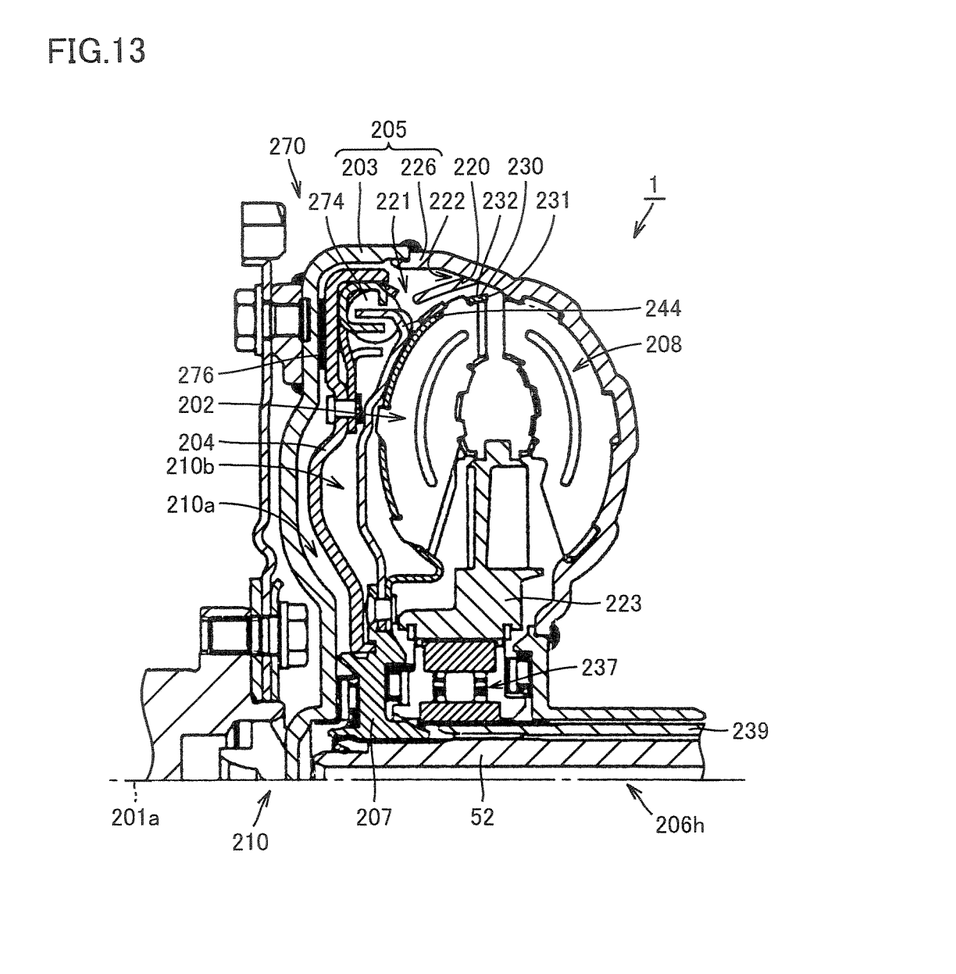
FIG. 13 is a cross sectional view of a torque converter according to a third embodiment of this invention.

FIG. 13 is a cross sectional view of torque converter according to a third embodiment of this invention. With reference to FIG. 13, torque converter 1 is a device for transmitting a torque from a crankshaft of an engine to input shaft 52 of a transmission. The engine is disposed on a left side in FIG. 13, and input shaft 52 disposed on a right side serves as a rotational axis of torque converter 1.

Torque converter 1 is constituted by a working fluid chamber having a turbine runner 202, a pump impeller 208 and a stator 223 as three kinds of blades, and a lock-up mechanism 270.

A front cover 203 having a circular disk shape is disposed on a front side of torque converter 1, that is, a side close to the engine, and is positioned so as to extend outside from a rotational axis 201a, that is, to extend in a radial direction. Front cover 203 acts as a front surface housing of torque converter 1. An impeller shell 226 is fixed to front cover 203. Various elements of torque converter 1 are disposed in a predetermined space of a case 205 constituted by front cover 203 and impeller shell 226. The space surrounded by front cover 203 and impeller shell 226 is a substantially sealed space and oil is enclosed within this space.

Front cover 203 is a member receiving a power from the engine. When a power is inputted from the engine to front cover 203, the power is transmitted to impeller shell 226. Impeller shell 226 constitutes pump impeller 208 that is integrally constituted with impeller shell 226. Pump impeller 208 is disposed so as to face turbine runner 202, and it is possible to rotate about a rotational axis of input shaft. Pump impeller 208 is provided with blades formed such that as the working fluid is pushed out toward turbine runner 202. When pump impeller 208 is rotated, the oil in the vicinity of pump impeller 208 is pushed out toward turbine runner 202.

Stator 223 is interposed between pump impeller 208 and turbine runner 202, and turbine runner 202 is operative to change a flow direction of oil flowing to pump impeller 208. Stator 223 is mounted to a fixing shaft 239 via a one-way clutch 237 and is capable of rotating only in one direction. A one-way clutch 237, a structure using a roller, a sprag, or a ratchet can be adopted. Stator 223 is a blade for controlling the flow of oil that returns from turbine runner 202 to pump impeller 208, and is constituted by resin or aluminum alloy.

Turbine runner 202 has a turbine shell 230 constituting a space for lubricating oil, and is disposed so as to face pump impeller 208. Turbine runner 202 receives oil sent out by pump impeller 208, a torque is given by this oil. The oil transmitted to turbine runner 202 moves to an inner circumferential side to be sent again to pump impeller 208 via stator 223. Turbine runner 202 is capable of rotating independently form pump impeller 208.

While pump impeller 208 rotates integrally with front cover 203, turbine runner 202 rotates integrally with a lock-up piston 204. A power train member 244 is disposed so as to come into contact with turbine shell 230. Power train member 244 is formed integrally with turbine shell 230 via a coupling part such as a rivet or a bolt, and rotates with turbine shell 230.

Both power train member 244 and turbine shell 230 are fixed to a turbine hub 207, thereby enabling rotation of input shaft 52 together with turbine hub 207. Turbine hub 207 is, for example, spline-fitted and is positioned on an outer circumferential side of input shaft 52. Turbine hub 207 connects input shaft 52 and turbine shell 230, and is operative to transmit a torque inputted into turbine shell 230 to input shaft 52.

Now, a description will be given of lock-up mechanism 270. Lock-up mechanism 270 is a device for transmitting a torque of front cover 203 directly to input shaft 206, in which a facing material 276 as a frictional material comes into contact with an inner circumferential surface of front cover 203, thereby the torque of front cover 203 is transmitted to input shaft 52. Lock-up mechanism 270 has a lock-up piston 204 for mounting facing material 276. Lock-up piston 204 is movable in an axial direction, that is, a direction closed to front cover 203 and a direction far from front cover 203, by which facing material 276 can abut against front cover 203. Lock-up piston 204 has a circular disk shape extending in a radial direction of rotation, and is disposed so as to face front cover 203.

Facing material 276 is fixed to an outer circumferential surface of lock-up piston 204, and is in contact with an inner circumferential side of turbine hub 207.

A space between front cover 203 and lock-up piston 204 is a first hydraulic chamber 210a, and a space between lock-up piston 204 and power train member 244 is a second hydraulic chamber 210b. First hydraulic chamber 210a and second hydraulic chamber 210b are respectively filled with oil. By changing hydraulic pressures, it is possible to move lock-up piston 204 in the direction close to front cover and the direction far from front cover 203.

Lock-up mechanism 270 is provided with a lock-up damper 274, and is operative to absorb variable input. Lock-up damper 274 is constituted by a spring member. When a torque is added, lock-up damper 274 is operative to absorb variation in the torque by action of the spring. Lock-up damper 274 is interposed between lock-up piston 204 and power train member 244.

A description will be given of operation of lock-up mechanism 270. In a case where torque amplifying action of torque converter 1 is not particularly required, facing material 276 is brought into contact with front cover 203, thereby transmitting a torque of front cover 203 directly to input shaft 52. Specifically, oil in first hydraulic chamber 210a is drained through communication hole 206h. Whereby, the hydraulic pressure in first hydraulic chamber 210a become lower than that in second hydraulic chamber 210b. As a result, lock-up piston 204 moves in the direction close to front cover 203, and facing material 276 comes into contact with front cover 203. Whereby, a power (torque) of the front cover 203 is transmitted to input shaft 52 via facing material 276, lock-up piston 204, power train member 244 and turbine hub 270. In this state, loss of the power by torque converter 1 hardly occurs, and the torque amplifying action also hardly occurs.

In a case where the torque amplifying action of the torque converter is required, oil is fed into first hydraulic chamber 210a through communication hole 206h. Whereby, a pressure in first hydraulic chamber 210a is higher, and lock-up piston 204 is pushed back in the direction far from front cover 203. As a result, a clearance is generated between front cover 203 and facing material 276, and a torque of front cover 203 is not transmitted to facing material 276.

To impeller shell 226 as a housing, outer circumferential surface surrounding member 220 is mounted so as to cover an outer circumferential surface of turbine shell. Outer circumferential surface surrounding member 220 has a shape along the outer circumferential surface of turbine shell 230, and extends with curvature from closed end 222 to open end 221. The extending direction is a direction toward lock-up mechanism 270. Outer circumferential surface surrounding member 220 is operative to rectify a flow of oil, and to feed the oil to lock-up mechanism 270.

That is to say, torque converter 1 as the power train mechanism according to the third embodiment includes turbine shell 230 as a rotating member constituting a fluid drive device; outer circumferential surface surrounding member 220 provided in oil of torque converter 1, for surrounding an outer circumferential surface 232 of turbine shell, while facing the outer circumferential surface 232 with a clearance therebetween to such a degree as to avoid contact with the outer circumferential surface 232 during rotation of the outer circumferential surface 232 of turbine shell; and impeller shell 226 as an end surface provided continuous to outer circumferential surface surrounding member 220, for surrounding axial end surface 231 of turbine shell 230. A side of outer circumferential surface surrounding member 220 axially opposite to impeller shell 226 is an open end 221.

Torque converter 1 includes lock-up mechanism 270 as a lock-up clutch. Outer circumferential surface surrounding member 220 extends from outer circumferential surface surrounding member 220 to open end 221 so as to close toward lock-up 270.

Torque converter 1 according to the third embodiment, thus configured has the same effects as the first embodiment.

Fourth Embodiment

Figure 14:
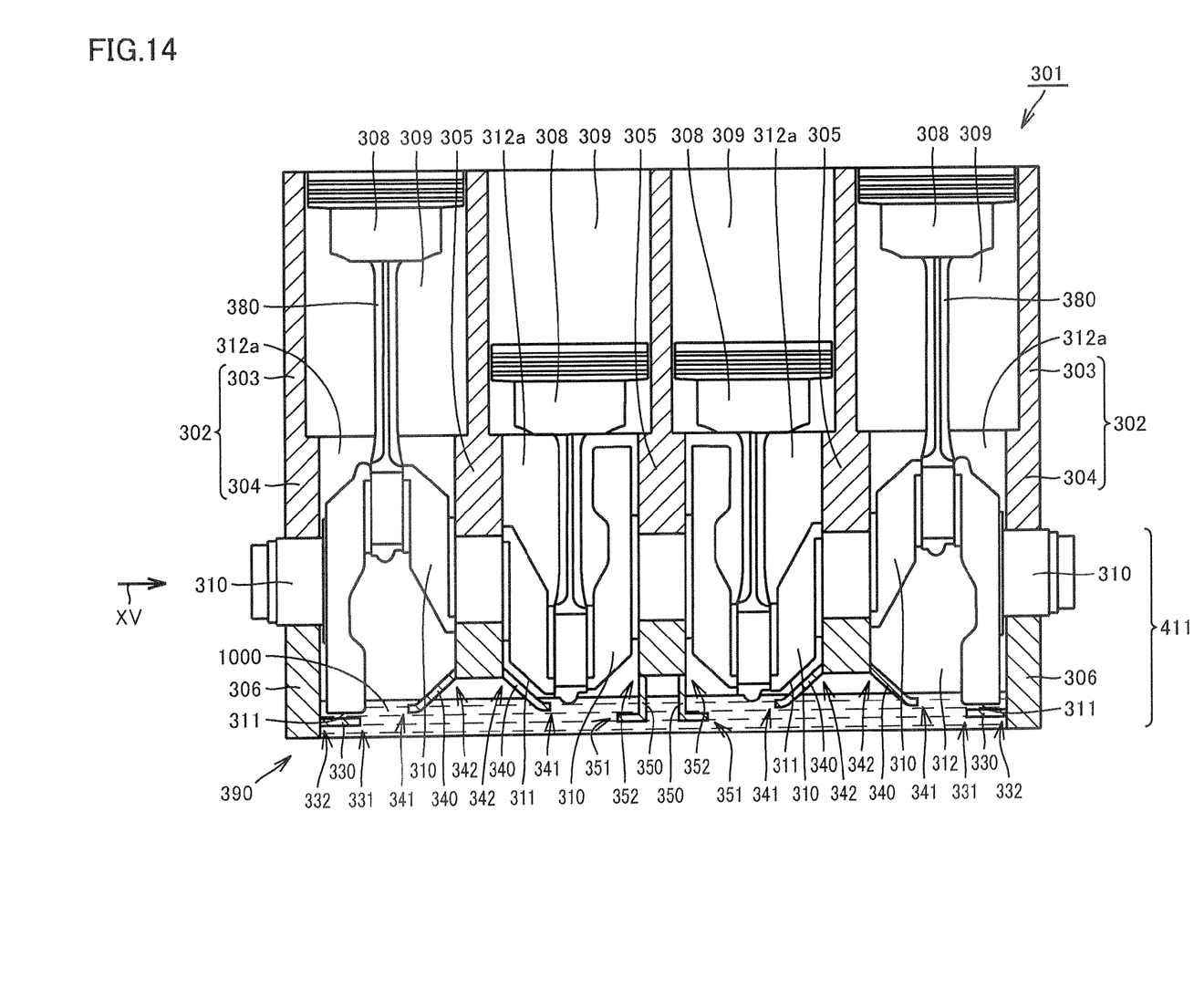
FIG. 14 is a cross sectional view of an engine as a power train mechanism according to a fourth embodiment of this invention.

FIG. 14 is a cross sectional view of an engine of a power train mechanism according to a fourth embodiment of this invention. With reference to FIG. 14, an engine 301 as the power train mechanism according to the fourth embodiment of this invention is an straight four-cylinder engine including four cylinders.

It is to be noted that this engine is not limited to the straight type engine, and various types of engines such as a V-type engine, a W-type engine, a horizontally opposed engine or other type engines can be adopted.

In addition, it is applicable to both a diesel engine and a gasoline engine.

Engine 301 is mainly constituted by a cylinder block 302, an oil pan 306, a cylinder head cover not shown in FIG. 14, and a piston 308. Cylinder block 302 includes a cylinder part 303 positioned in an upper portion, a skirt part 304 positioned in a lower portion and a partition wall 305 disposed between respective cylinder engines. A cylinder 309 is provided in an inside of cylinder part 303, piston 308 is fitted into cylinder 309. Piston 308 disposed between the respective cylinder engines is connected to a crankshaft 310 via a connecting rod 380.

Oil pan 306 is mounted below cylinder block 302. A crankcase 411 where crankshaft 310 is positioned is formed by skirt part 304 and oil pan 306 positioned in the lower portion of cylinder block 302. In an inner space 312 of crankcase 411, partition wall 305 connected downward from cylinder part 303 mentioned above is positioned, by which inner space 312 of crankcase 411 is formed so as to be divided into a crank chamber 312a corresponding to each cylinder engine.

The crankcase is filled with oil 1000, and a part of crankshaft 310 is soaked in oil 1000. Outer circumferential surface surrounding members 330, 340, 350 that face outer circumferential surface 311 of crankshaft 310 are respectively disposed in oil pan 306 and partition 305. Outer circumferential surface surrounding members 330 is soaked in oil 1000 and is formed with a clearance from crankshaft 310 and outer circumferential surface 311. Outer circumferential surface surrounding members 330, 340, 350 respectively extend from closed end 332 to open end 331.

In FIG. 14, at least one part of outer circumferential surface surrounding members 330, 340, 350 is soaked in oil 1000; however, this invention is not limited to this. A part of outer circumferential surface surrounding members 330, 340, 350 is not necessarily soaked in oil 1000, and entire part thereof may exist in air.

Figure 15:
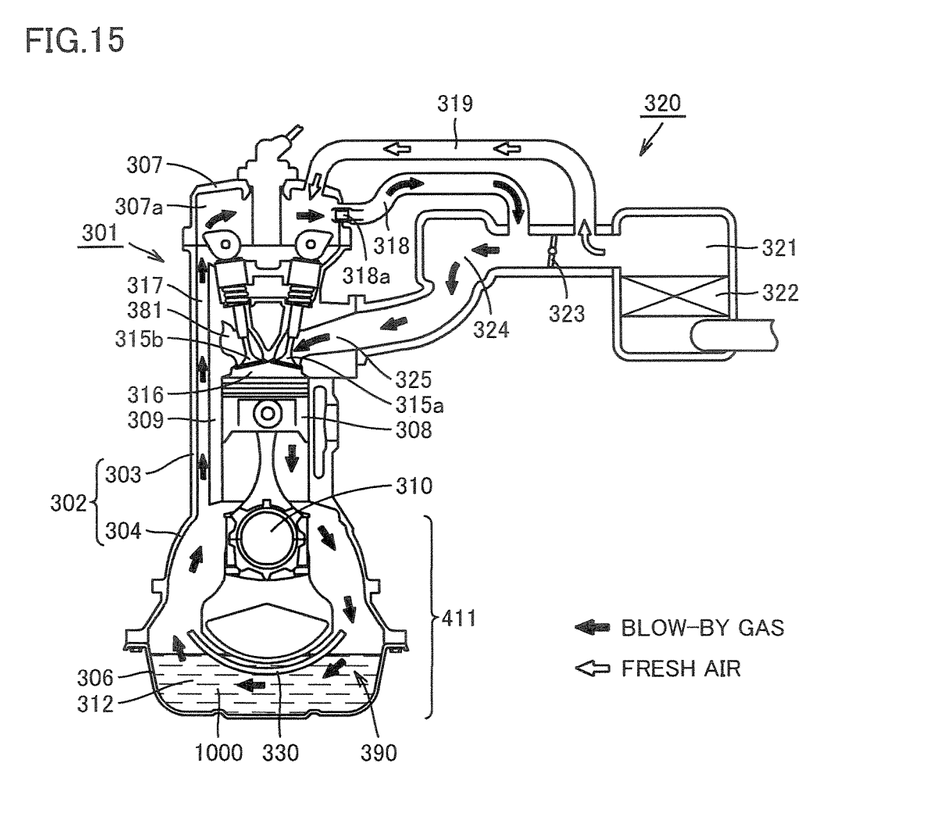
FIG. 15 is a side view including a partial cross section of the engine as viewed from a direction shown by arrow XV in FIG. 14.

FIG. 15 is a side view including a partial cross section of the engine as viewed from a direction shown by arrow XV in FIG. 14. Engine 301 is mainly constituted by cylinder block 302, oil pan 306, a cylinder head cover 307, and piston 308. Cylinder block 302 includes cylinder part 303 positioned in the upper portion, skirt part 304 positioned in the lower portion. Cylinder part 303 is provided within cylinder 309, and piston 308 is fitted in the inside of cylinder 309. Oil pan 306 is mounted below cylinder block 302. Whereby, crankcase 411 in which crankshaft 310 is established is formed by skirt part 304 of cylinder block 302 and oil pan 306.

Cylinder head cover 307 is mounted above cylinder block 302. Whereby, PCV chamber 307a is formed in an inside of cylinder head cover 307. PCV chamber 307a is in communication with a first PCV pathway 318 and a second PCV pathway 319 connected to cylinder head cover 307. Inner space 312 of crank case 411 and PCV chamber 307a mentioned above are connected to each other via a communication path 317 provided in a side wall of cylinder 309.

Blow-by gas is mixed gas leaking to inner space 312 of crank case 411 through a clearance between piston 308 and cylinder 309. Since the blow-by gas contains great deal of hydrocarbon and is mildly-acidic, too much blow-by gas causes deterioration of engine oil and rust within engine 301. In addition, since hydrocarbon is contained, it is not preferable to discharge it into air without any treatment. Accordingly, the blow-by gas is forced to be returned to an inlet system 320.

Inlet system 320 mainly includes an air cleaner 321, a throttle valve 323 and a surge tank 324. Air cleaner 321 has a filter 322, and normalizes air introduced into inlet system 320. Intake air normalized in air cleaner 321 is supplied to surge tank 324 after an intake air volume to be supplied to engine 301 is controlled in throttle valve 323. Intake air supplied to surge tank 324 is supplied from inlet valve 315a to a combustion chamber 316 within engine 301 through an inlet port 325. Fuel is combusted by the intake air supplied, and fuel gas is discharged to outside of engine 301 through an exhaust valve 315b and an exhaust port 381.

A power train mechanism 390 according to the fourth embodiment includes: crankshaft 310 as a rotating member converting reciprocating movement of piston 308 into rotational movement and lubricated with oil 1000; outer circumferential surface surrounding member 330 for surrounding outer circumferential surface 311 of crankshaft soaked in oil 1000, while facing outer circumferential surface 311 with a clearance therebetween to such a degree as to avoid contact with outer circumferential surface 311 during rotation of outer circumferential surface 311 of crankshaft 310; and oil pan 306 as an end surface surrounding member provided continuous to outer circumferential surface surrounding member 330, for surrounding axial one end surface of crankshaft 310, in which a side of the outer circumferential surface surrounding member 330 axially opposite to oil pan 306 is open end 331.

The power train mechanism 390 according to the fourth embodiment, thus configured has the same effects as the power train mechanism according to the second embodiment.

The invention can be applied to mechanisms having a unit rotating at a high speed at various parts other than the above-mentioned embodiments. Specifically, the invention can be used in an automatic transmission, a manual transmission, an engine, and the like. The invention can be applied to a clutch drum, a gear train, a differential gear, a counter gear, a torque converter, a fly-wheel, a clutch, a crankshaft, a balancer and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic transmission comprising:
   at least one rotating member, said rotating member including a clutch drum and a shaft, said clutch drum having a frictional engagement element being lubricated and cooled by oil;
   oil supply passages that supply oil to said rotating member, said oil supply passages being disposed in said shaft;
   an oil reservoir provided below said rotating member in a radial direction of the rotating member;
   an outer circumferential surface surrounding member that surrounds an outer circumferential surface of the rotating member, a first side of said outer circumferential surface surrounding member faces said outer circumferential surface with a clearance therebetween to such a degree as to avoid contact with said outer circumferential surface during rotation of said outer circumferential surface of said rotating member; and
   an end surface surrounding member provided continuously to said outer circumferential surface surrounding member, said end surface surrounding member axially surrounding one end surface of said rotating member,
   wherein a side of said outer circumferential surface surrounding member axially opposite to said end surface surrounding member is an open end, and
   wherein a bottom portion of said end surface surrounding member and a second side of said outer circumferential surface surrounding member, opposite said first side of said outer circumferential surface surrounding member, define the oil reservoir, said outer circumferential surface surrounding member is located closer to said rotating member relative to the bottom portion of said end surface surrounding member, and the open end of said outer circumferential surface surrounding member is located between the bottom portion of said end surface surrounding member and said rotating member.

2. The automatic transmission according to claim 1, wherein oil drain holes are disposed at a predetermined position in an axial direction of the outer circumferential surface of said rotating member, and an axial length of said outer circumferential surface surrounding member is set so as not to cover said oil drain holes in the axial direction.

3. The automatic transmission according to claim 1, wherein a plurality of grooves or ribs inclining with respect to a rotation direction of said rotating member from a side of said end surface surrounding member to the open end is provided on an inner surface of said outer circumferential surface surrounding member.

4. The automatic transmission according to claim 1, wherein said oil supply passages include a central oil passage extending in an axial direction of said shaft.

5. The automatic transmission according to claim 4, wherein said oil supply passages further include a forced feed oil passage extending radially from said central oil passage.

6. The automatic transmission according to claim 1, wherein said rotating member includes a frictional engagement element disposed on an inner circumferential side of said rotating member.

7. The automatic transmission according to claim 1, wherein said rotating member includes a power train part mounted to an outer circumference of said shaft.

8. The automatic transmission according to claim 3, wherein said grooves or ribs include a triangular prism shape.

9. The automatic transmission according to claim 1, wherein said outer circumferential surface surrounding member extends in an axial direction from said end surface surrounding member to said open end.

10. The automatic transmission according to claim 9, wherein said clearance in the radial direction of the rotating member between said first side of said outer circumferential surface surrounding member and said outer circumferential surface of said rotating member is substantially constant along said outer circumferential surface surrounding member in said axial direction.

* * * * *